United States Patent

Rojey et al.

[11] Patent Number: 5,983,915
[45] Date of Patent: Nov. 16, 1999

[54] METHOD OF TRANSPORTING GAS UNDER PRESSURE IN THE PRESENCE OF A LIQUID FILM

[75] Inventors: Alexandre Rojey, Reuil Malmaison; Thierry Palermo, La Garenne Colombes; Jean Falcimaigne, Bois Colombes, all of France

[73] Assignee: Institut Francais du Petrole, Rueil-Malmaison, France

[21] Appl. No.: 09/101,507
[22] PCT Filed: Nov. 12, 1997
[86] PCT No.: PCT/FR97/02030
  § 371 Date: Dec. 28, 1998
  § 102(e) Date: Dec. 28, 1998
[87] PCT Pub. No.: WO98/21489
  PCT Pub. Date: May 22, 1998

[30] Foreign Application Priority Data

Nov. 13, 1996 [FR] France .................................. 96/13925

[51] Int. Cl.[6] ...................................................... F17D 1/02
[52] U.S. Cl. ................................................................ 137/13
[58] Field of Search .................................................. 137/13

[56] References Cited

U.S. PATENT DOCUMENTS

| | | | |
|---|---|---|---|
| 3,220,874 | 11/1965 | Poettmann et al. | 117/97 |
| 3,601,079 | 8/1971 | Giles et al. | 137/13 X |
| 4,759,516 | 7/1988 | Grose | 244/130 |
| 4,958,653 | 9/1990 | Lowther | 137/13 |
| 4,991,614 | 2/1991 | Hammel | 137/13 |
| 5,020,561 | 6/1991 | Li | 137/13 |
| 5,816,280 | 10/1998 | Rojey et al. | 137/13 |

FOREIGN PATENT DOCUMENTS

| | | |
|---|---|---|
| 0364218 | 4/1990 | European Pat. Off. . |
| 0471465 | 2/1992 | European Pat. Off. . |
| 3918230 | 12/1990 | Germany . |

*Primary Examiner*—Gerald A. Michalsky
*Attorney, Agent, or Firm*—Antonelli, Terry, Stout & Kraus, LLP

[57] ABSTRACT

A method for transporting a fluid, for instance gas under pressure, in a pipe while reducing head loss to a minimum, comprises injecting into the pipe a fraction of a liquid with a predetermined flow rate so that the combination formed by the gas flow and the injected liquid fraction has the form of a ring-shaped control flow over at least the length of the pipe, and on delivery separating the injected liquid fraction from the gas under pressure.

21 Claims, 2 Drawing Sheets

METHOD OF TRANSPORTING GAS UNDER PRESSURE IN THE PRESENCE OF A LIQUID FILM

BACKGROUND OF THE INVENTION

The present invention relates to a method for reducing friction phenomena between a flowing fluid and the wall of a pipe in which it is carried.

It is applicable to transportation of gas under pressure, particularly that of natural gas under pressure, by reducing the pressure losses resulting from friction phenomena.

It relates in particular to a method for transporting natural gas under pressure in the presence of a liquid fraction, whereby the flow of the gas plus the liquid fraction is annular over at least part of the length of the pipeline.

Transportation of natural gas under pressure represents an important economic issue and intercontinental gas pipelines require substantial investment outlays. The gas is generally transported over long distances, with the transportation pressure being approximately 70 bars in the case of a land line but as high as approximately 160 bars in the case of a sea line. In the majority of cases, the natural gas transported contains at least 90% methane.

The pressure losses resulting from friction between the gas in turbulent flow and the inside wall of the pipeline are large, due in particular to the long distances, and contribute to increasing the cost of production. Hence it is necessary to reduce these pressure losses.

One method for offsetting pressure losses resulting from these friction phenomena consists of installing recompression stations regularly spaced along the pipeline and regulated to offset pressure losses. Such an arrangement considerably increases the necessary investment outlay and entails high energy consumption and operating costs.

Moreover, for sea lines, the recompression process during transportation presents implementation difficulties.

The prior art describes the use of additives such as polymers added to the fluid to be carried in specific proportions to reduce friction phenomena.

The method described in U.S. Pat. No. 4,958,653 enables the friction-reducing additives added to a pipeline to be proportioned in such a way that the gas flowrate is maximized for fixed pressure loss conditions.

The principal teaching of this reference is based on a method principally involving the following steps: a gas is introduced into a line under pressure, a quantity of additives is injected at a first point in the line, the gas flowrate is checked at a second point in the line, and the quantity of additives injected at the first point is adjusted until the gas flowrate measured at the second point reaches a maximum value.

The additive also fills in the unevennesses in the inside wall of the pipeline and decreases friction phenomena by minimizing protuberances.

However, such a method does not enable the pressure loses to be minimized for a fixed gas flowrate.

To transport a viscous liquid such as crude petroleum, a method has been described consisting of adding a less-viscous liquid, for example water, which flows with the higher-viscosity liquid and thus reduces wall friction.

It has been discovered that, in the case of a gas flowing under pressure, it is possible to reduce the pressure loss by injecting a liquid that is more viscous than the gas transported, meeting conditions that produce annular flow, as described in French Application EN. 96/08,914.

SUMMARY OF THE INVENTION

The present invention thus provides a method and its system of implementation that overcomes the aforesaid drawbacks of the prior art, and which consists of injecting a liquid fraction into a gas pipeline, for example under specific conditions, in order to form, with the gas being transported, an annular flow over at least part of the pipeline.

The liquid fraction thus injected will preferably form a stable film between the inside wall of the pipeline and the gas being transported, which adheres to the inside wall of the pipeline. The shear effects normally encountered at the boundary layer of the flowing gas when the flow is in direct contact with the inside wall of the pipeline are decreased by the presence of this stable annular film.

An advantageous application of the present invention is reducing pressure losses during transportation of a natural gas under pressure.

It can also be applied for transporting all types of industrial gases under pressure such as synthetic gases formed for example from a mixture of carbon monoxide and hydrogen, or for transporting hydrogen, ethylene, etc.

Advantageously it enables a natural gas under pressure containing at least 90% methane to be transported while minimizing pressure losses.

The present invention relates to a method for transporting a fluid, for example gas under pressure, such as a natural gas, in a pipeline from a first point to a destination point, for example a treatment station, while minimizing pressure losses. The method is characterized by comprising at least the following steps:

the gas under pressure is sent through the pipeline at a flowrate determined initially, for example, a liquid fraction is injected at least at a first point of the pipeline at a flowrate chosen so that the flowing gas and the injected liquid fraction together flow in an annular flow regime, whereby the liquid fraction forms a stable film over at least part of the inner surface of the pipe, the liquid fraction and the gas under pressure are separated on arrival at the destination.

A product such as a film-forming additive which promotes stability of the liquid film on the wall is injected with the liquid fraction for example.

The inner surface of the pipe may be made of a material wettable by the liquid fraction injected.

The inner surface of the pipe is for example provided with grooves and/or hollow areas promoting adhesion of the liquid film to the wall.

The flowrate or quantity for example of the liquid fraction injected is determined according to fluid flow diagrams, which may have been established previously.

Advantageously, the volume flowrate of the injected liquid fraction is controlled with respect to the volume flowrate of the flowing gas.

According to one embodiment of the method, the ratio between the volume flowrate of the liquid fraction injected when the gas is transported to the volume flowrate of the flowing gas is preferably less than 10%.

The minimum value of the ratio between the volume flowrate of the liquid fraction and the volume flowrate of the gas is preferably between 1% and 0.1%. In this way, a stable liquid film is obtained at the wall.

The value of the volume flowrate of the injected liquid fraction for example is regulated to maintain the ratio between the volume flowrate of the liquid fraction and the volume flowrate of the gas fraction in a range of values, chosen for example to maintain an annular flow characteristic.

A liquid fraction for example, at least partly formed of an organic phase or comprised at least in part of crude petroleum or a crude petroleum fraction or a condensate or fraction of condensate for example, is injected.

Simultaneously with the liquid fraction, a product such as a dispersant additive to avoid hydrate formation, and/or an anticorrosive additive, is injected.

The liquid fraction can advantageously be injected with a device designed to distribute this liquid fraction over substantially the entire periphery of the pipe.

The invention also relates to a method for transporting a fluid such as gas while minimizing pressure losses.

It is characterized in that the gas is transported in the presence of a liquid fraction in the form of an annular flow from a starting point to at least one recompression station, and in that the gas is separated from the liquid fraction before the recompression station, said separated liquid fraction is pumped and said separated gas fraction is compressed, said pumped liquid fraction is reinjected into said recompressed gas fraction, and the whole is transported in the form of an annular flow to a destination point or a recompression station.

The method applies in particular for transporting a natural gas containing at least 90% methane, under pressure.

According to one embodiment of the invention, the liquid fraction separated is recycled at at least one of the injection pipes.

The liquid fraction of the gas under pressure can be separated in a separator having at least one part of the cyclone type and/or a lining of the coalescer type.

BRIEF DESCRIPTION OF THE DRAWINGS

Other advantages and characteristics of the present invention will emerge from reading the description provided hereinbelow of embodiments, in the framework of nonlimiting applications, of natural gas transportation in a pipeline, referring to the attached drawings wherein.

DETAILED DESCRIPTION OF THE PREFERRED EMBODIMENTS

For better understanding of the idea of the invention, the description of the method provided hereinbelow applies to transportation of a natural gas under pressure, for example under transportation conditions similar to the conditions defined above, between a source point and a processing or storage arrival station, for example.

Figure 1A:
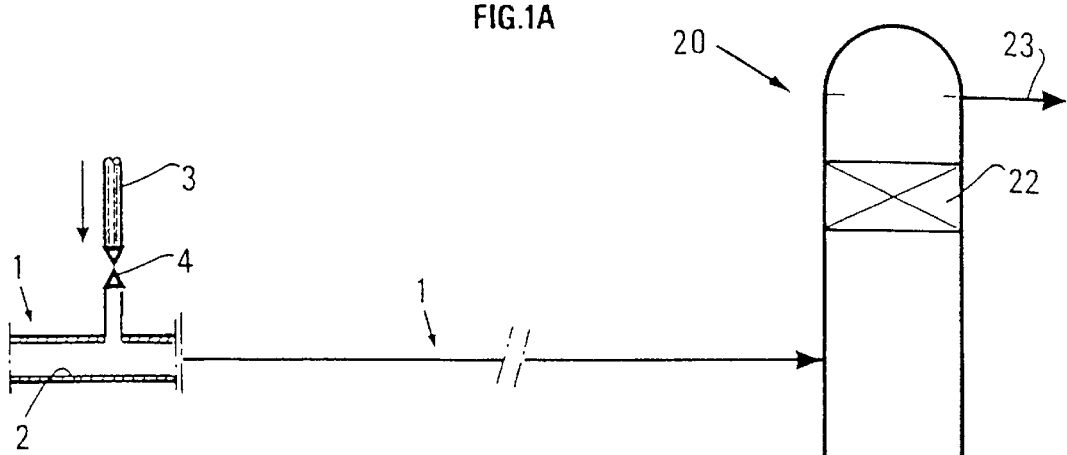
FIGS. 1A, 1B, and 1C show schematically the principle of injecting the liquid fraction into a pipeline carrying natural gas.

The method implemented is shown schematically in FIG. 1A. The natural gas to be transported circulates in a pipe 1 with a diameter D which is between 0.15 and 1.6 m for example and a corresponding section S. The natural gas circulates in the pipe at a rate whose value has been determined initially, and which corresponds to a surface velocity V defined by the flowrate/cross section ratio.

A liquid fraction (FIG. 1B) whose function is in particular to reduce friction between the flowing gas and the inside wall 2 of the pipe is injected at a first point of the pipe, for example through a pipe 3 terminating in pipeline 1, the pipe being provided with a flowrate-regulating valve 4, for example.

Figure 1B:
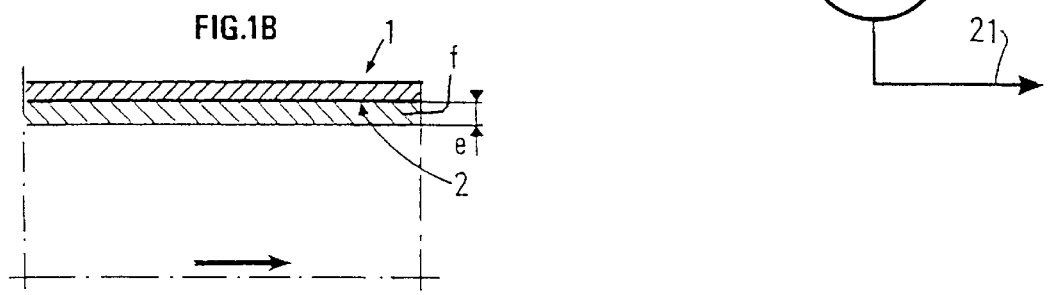

The conditions under which the liquid fraction is injected are described in detail hereinbelow and are such that the injected liquid fraction and the gas to be transported form an annular flow shown in the diagram of FIG. 1B.

The liquid fraction injected through pipe 3 forms a film f, preferably stable, adhering to inside wall 2 of pipeline 1, over at least part of the length "1" of the pipe between one point and the arrival station.

The need to have a stable film at the wall imposes a minimum value for the flowrate of the injected liquid.

For film f to be stable, it must have a minimum thickness e of a few millimeters for example, so that there must be a minimum value for the ratio between the liquid flowrate and the gas flowrate.

It has been found that this minimum value decreases with the value of the pipe diameter. The minimum value of the ratio between the liquid flowrate and the gas flowrate is for example between 1% for a pipe several inches in diameter and 0.1% for a pipe with a diameter of several tens of inches.

The stability conditions of the film thus formed may result from the conditions under which the liquid fraction is injected, and may be improved for example by adding additives or products with a stabilizing role to the liquid fraction.

Figure 1C:
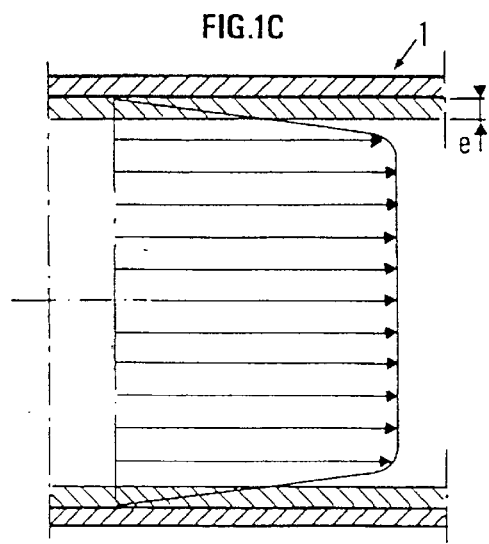

Stable liquid annular film f with thickness "e," counted from the inside wall of the pipeline (FIG. 1B), is entrained by the natural gas under pressure to be transported and circulating at a given mean velocity inside the pipe. Due to the interactions between the flowing gas and the liquid film, the gas flow generally has a velocity profile with the shape shown in FIG. 1C. The velocity components are substantially constant in the central area of the flow. On the other hand, in the boundary layer in direct contact with the inside wall of the pipe, viscosity phenomena bring about shear in this layer and the velocity components abide by a given profile.

The presence of a stable liquid film, interposed between the gas stream and the inside wall of the pipe, prevents these shear effects or at least minimizes them (in this case, the velocity at the gas-liquid interface is not zero).

The velocity gradient is thus reduced in the vicinity of the inside wall of the pipe, and the pressure loss is decreased in proportions that depend in particular on the flow conditions. The reduction in pressure loss thus obtained may be greater than 15 to 20%.

The flow conditions, in particular the conditions under which the liquid fraction is injected to form the annular film adhering to the wall and obtain a flow of the annular gas-liquid type, are for example determined from the distribution diagrams of the flow regime that are associated with a fluid of a given composition.

Figure 2:
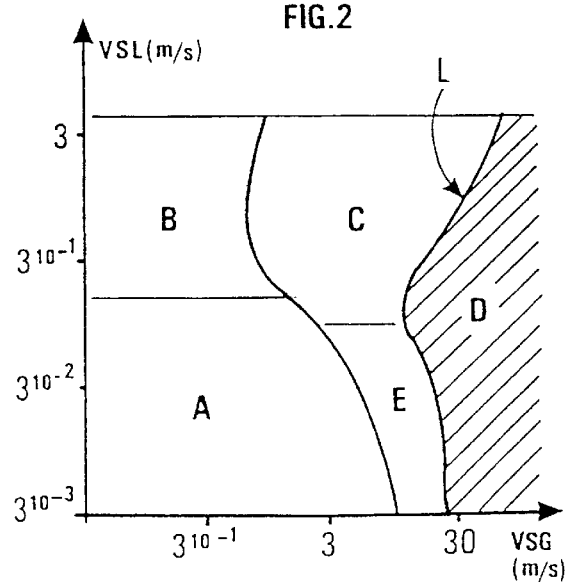
FIG. 2 is a diagram of the surface velocities (flowrate/cross section) of the gas and the liquid, the zones defining patterns that a fluid flowing in a pipe may assume, in particular the annular flow area targeted in the method according to the invention.

The diagram in FIG. 2 shows different flow regimes of a fluid formed by a liquid and a gas as a function of the surface flowrates of the gas and liquid, respectively.

Zones A, B, C, and E correspond to a stratified flow regime for the fluid.

Zone A corresponds to non-wave stratified flow; zone B to bubble flow for which one of the phases is in the form of bubbles of various sizes inside a second phase. Zone C is associated with a plug flow regime comprised of a succession of plugs of gas and liquid. Zone E corresponds to a wave-type stratified flow regime.

Zone D, which is beyond the boundary line L, relates to an annular flow regime.

The gas surface velocity VSG is defined as the gas flowrate relative to the cross section of the pipe, and the surface velocity of the liquid fraction VSL is also defined as the ratio between the flowrate and the pipe cross section.

The flow regime distribution diagrams may have been obtained previously by tests conducted on a gas with a known composition during which the values of the flowrate of the flowing gas and the surface velocity at which the liquid fraction is injected into the pipeline are varied and the various distribution diagrams of the flow regimes are plotted.

For a flow regime distribution diagram, a boundary line L is determined, defined by a set of values for the surface velocities of the gas and liquid, separating fluid annular flow regime zone D from the other flow regimes.

It will be noted that the annular flow regime is obtained for a relatively high gas surface flowrate VSG and a relatively low liquid fraction flowrate VSL.

From a distribution diagram as shown in FIG. 2, it is possible to determine the minimum surface flowrate values of the gas to be transported that enable an annular flow to be obtained.

The liquid fraction injection conditions are preferably such that the liquid fraction flowrate during gas transportation represents less than 10% of the volume flowrate of the gas to be transported.

It will be observed that, under the conditions described in FIG. 2, the gas must be circulated at a high velocity relative to normal transportation conditions.

This may lead to relatively high pressure loss values, even though the presence of a liquid film reduces the value of the pressure loss corresponding to these conditions.

Hence it is advantageous to operate with means for improving the stability of the liquid film and thus obtain an annular flow characterized by the presence of a stable liquid film over at least part of the inner surface of the pipe, for gas circulation velocities that are substantially less than those necessary in the absence of said means, and comparable to the circulation velocities normally used in gas pipelines.

According to one embodiment of the invention, an additive promoting stability of the liquid film f is injected with the liquid fraction.

The liquid fraction has, for example, a film-forming additive that favors wetting of the inside wall of the pipe by the liquid fraction.

It is also possible to inject, with the liquid fraction, a thickening agent such as a polymer promoting stability of the liquid film.

According to another embodiment of the method according to the invention, the liquid fraction is injected with one or more anticorrosion additives and/or one or more additives used to prevent formation of hydrates that could clog pipelines. The antihydrate additive is for example a dispersant of the surfactant type which, in the presence of water, prevents water droplets and hydrate crystals from agglomerating.

The liquid fraction containing anticorrosion and/or antihydrate additives reinforces their action by forming a film at the wall since the cooling due to the external environment is for example more perceptible in the vicinity of the wall.

Any additive normally used to prevent corrosion and/or hydrate formation may be added to the liquid fraction.

According to another embodiment of the invention, a pipeline with an inner surface that promotes adhesion of the liquid film to the wall and/or the flow of the liquid film is used.

The inner surface of the pipe has, for example, a coating chosen to promote adhesion of the film to the wall, or it can be treated accordingly.

It can, for example, undergo a surface treatment designed to improve the wettability of the inner surface of the pipe by the liquid film.

Figure 5:
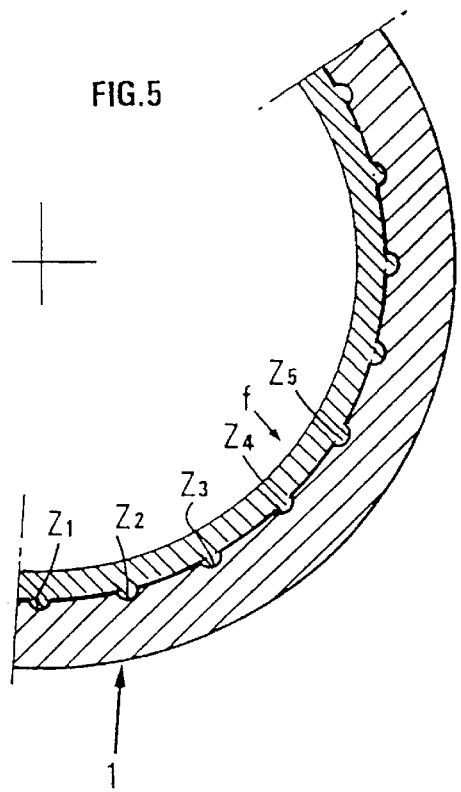
FIG. 5 shows a cross section of a grooved pipeline facilitating adhesion of the liquid film.

It is also possible to use a pipe having a certain surface roughness value, or a pipe whose inside wall is provided with means such as grooves that preferably extend lengthwise, as shown in FIG. 5.

This FIG. 5 is a cross section through a pipe element having five grooves Z1, Z2, Z3, Z4, and Z5 promoting adhesion and flow of the liquid film, the grooves being disposed on the inner surface of the pipe.

These regularly disposed grooves may be for example approximately one-tenth or several tenths of a millimeter in depth. The surface can also be covered with hollow zones whose depth is for example approximately one tenth or several tenths of a millimeter and be several tens of millimeters for example in size.

Without departing from the framework of the invention, and according to another embodiment of the invention, the system has several pipes similar to pipe 3 for injecting a liquid fraction, for example at points regularly spaced along the pipe. The injection conditions must be such that the ratio between the liquid flowrate and the gas flowrate remains within a preset range at any point in the pipe.

It is also possible to combine the effects resulting from addition to the liquid fraction of a product that stabilizes the liquid film, as well as a surface condition that also contributes to stabilizing this liquid film.

The system for implementing the steps of the invention is for example equipped with devices measuring parameters characterizing the transportation conditions, for example temperature and pressure sensors that are for example distributed along pipeline 1.

Knowledge of these parameters can advantageously be used to correct the quantity of liquid injected.

Moreover, it has for example control and management means such as a microcontroller for storing data, connected to the various system elements to acquire measurements and send control signals to the devices to be regulated such as flowrate regulating valves to regulate the process and in particular adapt the conditions under which the liquid fraction is injected, possibly during production.

Thus, implementation of the method may take place for example according to the following conditions:

the geometry of the pipe is known, because it was chosen initially as a function in particular of the condition of the natural gas to be transported, the pressure and temperature conditions which are for example estimated and/or determined during transportation, and the desired flowrate value on arrival, the flowrate value of the gas to be transported is determined and/or established, as are the conditions under which the gas is transported, and when the composition of the natural gas to be transported is known, and flow distribution diagrams are available, these being a function particularly of the transportation conditions, a controlled liquid fraction flow is sent in order to transport the gas and the injected liquid fraction the form of an annular flow.

The gas and the injected liquid fraction are thus carried to a final destination point or an intermediate point in the form of an annular flow regime, for example a processing location or a recompression station.

In order for the flowrate of the liquid fraction sent to be constantly adjusted to maintain the flow in an annular form, it is possible to connect flowrate-regulating valve 4 to the microcontroller, which controls it in such a way as to obtain a ratio R between the volume flowrate of the liquid fraction and the volume flowrate of the transported gas which is in a range delimited by a minimum threshold value Rmin and a maximum threshold value Rmax. The two threshold values are fixed for example or can be adjusted according to transportation conditions.

The maximum threshold value Rmax of the ratio between the volume flowrate of the liquid fraction and the volume flowrate of the gas is preferably less than 10%.

The minimum threshold value Rmin of the ratio between the liquid volume flowrate and the gas volume flowrate is between 1% and 0.1% for example.

The injected liquid fraction is preferably at least partially comprised of an organic phase whose volatility is sufficient low to avoid too great an evaporation loss in the gas phase.

This liquid fraction is formed for example by a $C_{5+}$ hydrocarbon fraction whose components have at least five carbon atoms.

It can be formed for example by a crude petroleum or a crude petroleum fraction.

To transport an associated gas, it is possible to inject into the pipeline, as a liquid fraction, a crude petroleum fraction produced at the same time as the associated gas to reduce the pressure loss by adjusting the value of the liquid fraction volume flowrate to gas volume flowrate ratio. The method according to the invention thus applies to separate transportation of crude petroleum and associated gas wherein a controlled flow of crude petroleum is for example injected at the inlet of the pipeline of the associated gas to reduce pressure losses encountered in the pipeline of the associated gas.

The liquid fraction can also be comprised of a condensate or a condensate fraction. In the case of a condensate gas, a fraction of the condensate produced at the same time as the gas can thus be injected into the gas pipe to reduce the pressure loss, for example by adjusting the value of the ratio between the liquid fraction volume flowrate and the gas volume flowrate.

The method applies advantageously to separate transportation of condensate and gas. A controlled condensate flow is for example injected into the gas pipeline to reduce the pressure losses encountered in the gas pipeline.

The liquid fraction can also be comprised of an aqueous phase, preferably containing an organic solvent. An alcohol such as methanol or a glycol such as monoethylene glycol or diethylene glycol can be used.

In the case of a gas saturated with water, a controlled flow of organic solvent designed to avoid hydrate formation can be injected for example at the inlet of the gas pipeline; this solvent may have water added to produce a laminar flow throughout the length of the pipe, for example.

Indeed, in such a case, the quantity of water present in the gas, which may become deposited inside the pipe, for example by condensation, is relatively small and varies along the pipe. This does not enable a stable annular flow regime to be produced through the length of the pipe. Addition of the solvent and water overcomes this drawback.

Figure 3:
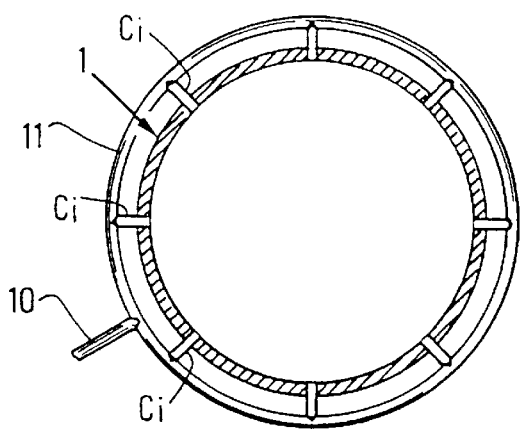
FIG. 3 shows schematically a cross section of a pipeline and a specific liquid fraction injection system.

To assist distribution of the liquid fraction at the inside wall of the pipeline, it can be injected into the pipeline with a device such as that described in FIG. 3, preferably in such a way that it is distributed over the entire circular section of the pipe.

For this purpose, the liquid fraction arriving through injection pipe 10 similar to injection pipe 3 passes into a circular pipe 11 disposed such as to surround the pipeline. The circular pipe communicates with the inside of the pipeline by means of orifices or auxiliary pipes Ci, spaced apart from each other, preferably at substantially regular intervals, over the entire circumference of the pipeline.

The shapes of injection pipes Ci and their distribution along the circular pipe or at least part thereof are chosen so that the pressure losses in injection pipes Ci are greater than the pressure losses in circular pipe 11 and injection pipe 10. This ensures good distribution of the liquid fraction injected and optimizes formation of the liquid film whose role is to minimize friction between the gas and the wall.

The geometry and inclination of injection pipes Ci are chosen for example according to the nature of the liquid fraction injected and the gas transported to prevent any problems during injection; any turbulence that could result from the injection operation for example.

On arrival at the processing station or destination, for example, the natural gas is separated from the liquid fraction injected, which may or may not contain additives, as stated above.

For this purpose, the separation device has for example, as shown in FIG. 1A, a separator 20 preferably disposed vertically. The annular flow is composed of at least the liquid fraction and the transported gas is introduced into separator 20 through pipe 1. The liquid fraction separated is evacuated at the bottom of the separator through pipe 21.

The gaseous fraction, or gas, passes for example into a droplet catcher 22 whose purpose is to catch the droplets entrained by the gas and which comprises for example a lining bringing about coalescence, before being evacuated through pipe 23 disposed at the head of the separator.

Figure 4:
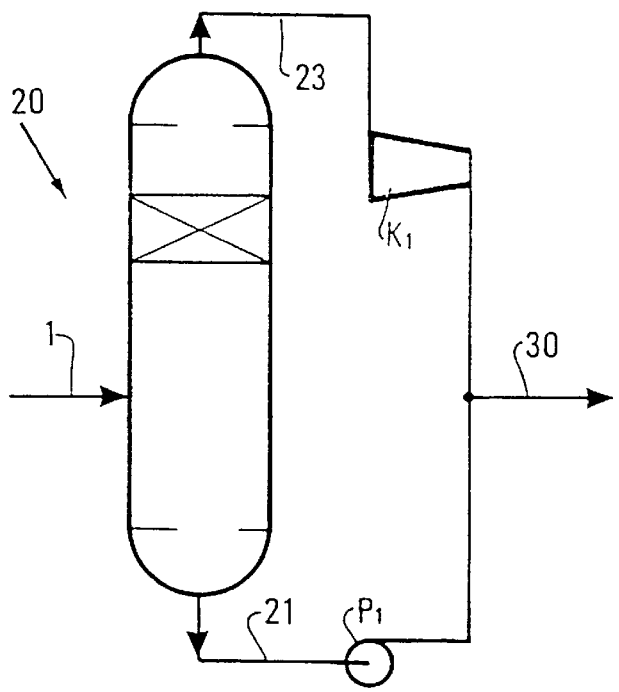
FIG. 4 shows schematically one embodiment of the method including a recompression station.

After separation, the gas can be recompressed in a compressor $K_1$ for example according to the diagram in FIG. 4 then sent after recompression to a pipe 30.

The liquid fraction separated is for example pumped by pump $P_1$ to be injected at the input of pipe 30 with the recompressed gas.

The recompressed gas and the pumped liquid fraction are transported in the form of an annular flow to a destination point or a recompression station.

We claim:

1. Method for transporting a gas under pressure in a pipe from a point to a destination location while minimizing pressure losses, characterized in that it comprises the following steps:

the gas under pressure is sent through the pipeline at a flowrate determined initially, a liquid fraction is injected at least at a first point of said pipeline at a flowrate chosen so that the flowing gas and the injected liquid fraction together flow in the form of an annular flow regime, whereby the liquid fraction forms a stable film over at least part of the inner surface of the pipe, the liquid fraction and the gas under pressure are separated on arrival at the destination.

2. Method according to claim 1, characterized in that a film-forming additive promoting stability of the liquid film on the wall is injected with the liquid fraction.

3. Method according to claim 1, characterized in that inner surface of the pipe is comprised of a material wettable by the injected liquid fraction.

4. Method according to claim 1, characterized in that the inner surface of the pipe is provided with grooves promoting adhesion of the liquid film to the wall.

5. Method according to claim 1, characterized in that the flowrate of the liquid fraction to be injected is determined by fluid flow diagrams.

6. Method according to claim 1, characterized in that the value of the ratio between the liquid fraction volume flowrate and the gas volume flowrate is controlled.

7. Method according to claim 1, characterized in that the ratio between the volume flowrate of the liquid fraction injected and the volume flowrate of the gas is less than 10%.

8. Method according to claim 1, characterized in that the minimum value of the ratio between the liquid fraction volume flowrate and the gas volume flowrate is between 1% and 0.1%.

9. Method according to claim 1, characterized in that the volume flowrate of the liquid fraction injected is regulated such as to keep the value of the ratio between the liquid fraction volume flowrate and the gas volume flowrate within a range of values permitting the shape of the annular flow to be maintained.

10. Method according to claim 1, characterized in that a liquid fraction at least partly comprised of crude petroleum is injected.

11. Method according to claim 1, characterized in that an anticorrosion additive is injected.

12. Method according to claim 1, characterized in that in that the liquid fraction is injected by means of a device designed to distribute said liquid fraction over the majority of the periphery of the pipeline.

13. Method according to claim 1, characterized in that the gas is transported in the presence of a liquid fraction in the form of an annular flow from a starting point to at least one recompression station, and in that the gas is separated from the liquid fraction before the recompression station, said separated liquid fraction is pumped and said separated gas fraction is compressed, said pumped liquid fraction is reinjected into said recompressed gas fraction, and the gas plus liquid fraction are transported in the form of an annular for the recompression station flow to a downstream point.

14. Method according to claim 13, wherein the downstream point is the destination location.

15. Method according to claim 13, wherein the downstream point is another recompression station.

16. Application of the method according to claim 1 for transporting natural gas containing at least 90% methane.

17. Method according to claim 1, characterized in that the inner surface of the pipe is provided with hollow areas promoting adhesion of the liquid film to the wall.

18. Method according to claim 1 characterized in that an antihydrate dispersant is injected.

19. Method according to claim 1, characterized in that a liquid fraction at least partly comprised of crude petroleum fraction is injected.

20. Method according to claim 1, characterized in that a liquid fraction at least partly comprised of a condensate is injected.

21. Method according to claim 1, characterized in that a liquid fraction at least partly comprised of a condensate fraction is injected.

* * * * *